(12) United States Patent
Ellenkamp-Van Olst et al.

(10) Patent No.: US 10,189,613 B2
(45) Date of Patent: Jan. 29, 2019

(54) CLOSURE ASSEMBLY

(71) Applicant: Weener Plastics Netherlands B.V., Tilburg (NL)

(72) Inventors: Lenny Marita Ellenkamp-Van Olst, Doetinchem (NL); Willem Ramon, Woerden (NL); Albertus Rap, Ede (NL); Gerrit Jan Stegeman, Lochem (NL); Sebastiaan Wilhelmus Josephus den Boer, Twello (NL)

(73) Assignee: WEENER PLASTICS NETHERLANDS B.V., Tilburg (NL)

( * ) Notice: Subject to any disclaimer, the term of this patent is extended or adjusted under 35 U.S.C. 154(b) by 24 days.

(21) Appl. No.: 15/110,672

(22) PCT Filed: Jan. 8, 2015

(86) PCT No.: PCT/NL2015/050012
§ 371 (c)(1),
(2) Date: Jul. 8, 2016

(87) PCT Pub. No.: WO2015/105422
PCT Pub. Date: Jul. 16, 2015

(65) Prior Publication Data
US 2016/0347517 A1 Dec. 1, 2016

(30) Foreign Application Priority Data

Jan. 8, 2014 (NL) ...................................... 2012060
Apr. 30, 2014 (NL) ...................................... 2012717

(51) Int. Cl.
*B65D 35/46* (2006.01)
*B65D 47/20* (2006.01)
(Continued)

(52) U.S. Cl.
CPC ......... *B65D 47/2031* (2013.01); *B65D 35/46* (2013.01); *G01F 11/082* (2013.01);
(Continued)

(58) Field of Classification Search
CPC .... B65D 47/2081; B65D 35/46; B65D 47/24; B65D 47/04; B65D 47/00; B65D 47/08; B65D 47/2031; G01F 11/082
See application file for complete search history.

(56) References Cited

U.S. PATENT DOCUMENTS 1,989,714 A   2/1935 Statham
5,033,655 A * 7/1991 Brown .................. B29C 65/568
                                                     222/212

(Continued)

FOREIGN PATENT DOCUMENTS

BE       892238      6/1982
JP       H0273151    6/1990
JP       3133749     6/1991

*Primary Examiner* — Frederick C Nicolas
(74) *Attorney, Agent, or Firm* — Tutunjian & Bitetto, P.C.

(57) ABSTRACT

The invention relates to a closure assembly configured to be mounted on a neck of a container, which closure assembly includes a cap with a dispensing opening and a self-closing dispensing valve attached to the cap such that it is located adjacent the dispensing opening, and wherein the dispensing valve is a disc of foil material having a central valve area in which at least one self-closing slit is located and an annular peripheral attachment area extending around the central valve area, with which attachment area the dispensing valve is attached to the attachment area of the dispensing cap such that its central valve area aligns with the dispensing opening of the dispensing cap to close off that dispensing opening, and wherein an annular rib offsets the central valve area of the dispensing valve relative to a substantially flat attachment area of the cap.

22 Claims, 7 Drawing Sheets

(51) Int. Cl.
*G01F 11/08* (2006.01)
*B65D 47/08* (2006.01)
*B65D 47/00* (2006.01)
*B65D 47/04* (2006.01)

(52) U.S. Cl.
CPC .............. *B65D 47/00* (2013.01); *B65D 47/04* (2013.01); *B65D 47/08* (2013.01); *B65D 47/2081* (2013.01)

(56) References Cited

U.S. PATENT DOCUMENTS

| | | | | |
|---|---|---|---|---|
| 5,271,531 A | * | 12/1993 | Rohr | B65D 47/0833 215/232 |
| 5,924,605 A | * | 7/1999 | Baudin | B65D 47/38 222/212 |
| 6,089,411 A | * | 7/2000 | Baudin | B65D 47/2031 222/212 |
| 7,152,763 B2 | * | 12/2006 | Stull | B29C 45/0081 222/212 |
| 7,306,128 B2 | * | 12/2007 | Eimer | B65D 47/0823 137/847 |
| 8,662,104 B2 | * | 3/2014 | Hansmann | A61M 16/20 137/493 |
| 2004/0251278 A1 | * | 12/2004 | Arai | B65D 47/2031 222/212 |
| 2016/0001936 A1 | * | 1/2016 | Rap | B65D 47/2031 222/490 |

* cited by examiner

CLOSURE ASSEMBLY

TECHNICAL FIELD

The present invention relates to a closure assembly configured to be mounted on a neck of a container, in particular to be mounted on the neck of a flexible container such as a squeeze bottle or a tube, and a device and method for providing such a closure assembly.

DESCRIPTION OF RELATED ART

Containers such as squeeze bottles and tubes are typically provided with closure assemblies to enable controlled dispensing of the contents of the container. Such a closure assembly comprises a cap with a dispensing opening for dispensing the content, which cap is configured to be mounted on a neck part of the container. The cap is furthermore configured to support a self-closing valve to close off the dispensing opening.

Such a resilient, self-closing valve, is typically clamped in the closure cap adjacent the dispensing opening. Many types of self-closing valves are known.

The disc type valves typically consist of disc of rubber material, such as U.S. Pat. No. 1,989,714 and U.S. Pat. No. 3,445,042, provided with a central valve area having one or more slits. The disc type valve is positioned in the cap adjacent the dispensing opening, and is fixed in position using an insert in the form of a clamping ring. After the valve has been placed in the cap, it is fixed in its position by placing clamping ring over the valve. Often the clamping ring is placed in a sequential production step.

Lately, plain disc type valves have been replaced by injection molded valves of a more complicated design and shape. These types of valves are for example disclosed in WO2008/074517 and U.S. Pat. No. 5,743,443. The injection molded valves are complicated in design and the injection molding process makes these kinds of valves rather expensive.

SUMMARY OF THE INVENTION

It is an object of the invention to provide an alternative closure assembly, preferably a low cost closure assembly.

The invention aims to provide an alternative closure assembly, preferably a closure assembly with a low cost valve that allows for an alternative, preferably simplified production process.

According to the present invention, this object is achieved by providing a closure assembly according to the present principles. The invention furthermore provides a device and a method for providing a closure assembly according to the present principles.

A closure assembly according to the present principles is configured to be mounted on a neck of a container, and comprises a cap with a dispensing opening and a self closing dispensing valve in the form of a disc of foil material. In one embodiment, the self closing dispensing valve is attached to the cap such that it is located adjacent the dispensing opening of the cap. In an alternative embodiment according to the invention, the self closing dispensing valve is attached to an insert, which insert is provided in the cap such that the valve is located adjacent to the dispensing opening of the cap.

Using a foil type material for providing a valve allows for a simple and low cost valve. However, when a valve made of such a material is attached to a cap or insert using heat sealing techniques, the central valve area covering the dispensing opening tends to ripple and thus the valve function is lost.

According to the invention the respective cap or insert is provided with a rib element that offsets a central valve area relative to a peripheral valve area attached to the cap or insert. The rib element enables straining the valve, i.e. stretching the valve without substantially transforming the valve and thus maintaining the valve function, while being attached to the cap or insert. Thus, a valve made of a thin foil material can be attached to the cap using heat sealing techniques.

Experiments have shown that valves made of foil type material having a thickness of less than 0.7 mm, for example in the range of 0.005 mm-0.6 mm, preferably having a thickness in the range of 0.01 mm-0.5 mm, function especially well within an closure assembly according to the invention.

In an embodiment according to the invention, the closure assembly comprises a cap and a self-closing dispensing valve attached to the cap.

The dispensing cap comprises a cylindrical shaped body section having a central axis. The cylindrical body section defines an inner space extending along said central axis, an access opening at one end of the inner space for inserting the neck of the container into the inner space, and a top wall at another end of the inner space. The top wall has an inside surface facing the inner space and an outside surface facing the opposite direction, and is provided with the dispensing opening for dispensing the contents of the container.

The inside surface of the top wall defines a substantially flat and annular attachment area, which attachment area extends around the dispensing opening. The inside surface furthermore defines an annular rib, which rib is located between the attachment area and the dispensing opening, and which rib protrudes relative to the substantially flat attachment area.

The dispensing valve is a disc of foil material having a central valve area in which at least one self-closing slit is located and an annular peripheral attachment area extending around the central valve area. With the attachment area the dispensing valve is attached to the attachment area of the dispensing cap, preferably by way of heat sealing, such that its central valve area aligns with the dispensing opening of the dispensing cap to close off that dispensing opening. According to the invention, the annular rib offsets the central valve area of the dispensing valve relative to the substantially flat attachment area of the cap in an inward direction.

Providing the cap with a rib element that protrudes relative to the substantially flat attachment area of the cap to offset the central valve area relative to the peripheral valve area allows for stretching the valve when being attached to the cap, and thus for using a valve of thin foil material and heat sealing for fixing it to the cap.

Also, securing the valve to the cap obviates the use of a clamping ring, which in turn reduces material costs and/or allows for a simplified production process.

In an embodiment the rib element of the cap is provided adjacent the dispensing opening, such that the rib element partially defines the insert opening.

In an embodiment the valve has a top surface that faces the top wall of the cap and a bottom surface that faces away from the top wall of the cap, and wherein, in a direction perpendicular to the attachment area of the cap, the top surface of the central area of the valve is located below the bottom surface of the peripheral area of the valve. In an embodiment according to the invention this distance is at least 0.01 mm larger than the thickness of the valve, preferably is at least 0.05 mm. In a further embodiment, the distance is at least similar to the thickness of the valve, preferably at least 1.5 times the thickness of the valve, for example 2.5 times the thickness of the valve. Providing valve and annular rib element with these dimensions provides a foil type valve heat sealed to the insert, with good valve functions.

In an embodiment the annular rib element of the cap has a height measured from the substantially flat attachment area of the cap, and the foil type valve has a thickness, and the height of the annular rib element is similar to or larger than the thickness of the foil type valve, preferably is at least 1.5 times the thickness of the foil type valve, more preferably is at least 2.5 times the thickness of the valve, for example is 6 times the thickness of the valve. Providing valve and annular rib element with these dimensions provides a foil type valve heat sealed to the insert, with good valve functions.

In an embodiment the annular rib element of the cap has a height measured from the substantially flat attachment annular area of the cap, which height is at least 0.05 mm, preferably is in the range of 0.1 mm-0.5 mm, preferably is at least similar to the thickness of the foil attached to the cap or insert, more preferably is at least 1.5 the thickness of the foil attached to the cap, for example is at least 0.15 mm for example has a height of 0.3 mm.

In an embodiment the cap is provided with an insert to adapt the inner space of the cap to the neck element of the container. The insert comprises a disc shaped body section, having a top surface, a bottom surface and a guide opening for guiding through the contents of the container, and which top surface defines an annular rib that protrudes relative to top surface which rib and that extends around the guide opening. The insert further comprises a cylindrical body section having a central axis, which cylindrical insert body section defines a dispensing channel extending along said central axis and an access opening at one end of the dispensing channel for inserting the neck of the container into the dispensing channel. The cylindrical shaped body section is attached to the bottom surface of the disc shaped body section of the insert such that the dispensing channel forms an extension of the guide opening.

The dispensing cap and the insert are preferably configured such that the insert is fixed, preferably clamped, in the inner space of the cap such that the top surface of the dis shaped body section faces the inside surface of the top wall of the cap, the guide opening of the insert aligns with the dispensing opening in the top wall of the cap, and the foil type vale is pinched between the annular rib element of the insert and the top wall of the cap.

In a further embodiment according to the invention, the annular rib element of the insert has a height measured from the top surface of the disc shaped body section of the insert, and the annular rib element of the cap has a height measured from the substantially flat and annular attachment area of the top wall of the cap. The height of the annular rib element of the insert is greater than the height of the annular rib element of the cap to at least such an extent that the rib element of the insert keeps the top surface of the disc shaped body of the insert spaced apart from the annular rib element of the cap and the dispensing valve supported by that rib element.

In an alternative embodiment of a closure assembly according to the invention, the assembly configured to be mounted on a neck of a container comprises a cap, an insert and a self-closing dispensing valve attached to the insert, which insert is provided in the cap such that the valve is located adjacent to the dispensing opening of the cap.

The dispensing cap comprises a cylindrical shaped body section having a central axis, which cylindrical body section defines an inner space extending along said central axis, an access opening at one end of the inner space for inserting the neck of the container into the inner space, and a top wall at an opposite end of the inner space. The top wall has an inside surface facing the inner space and is provided with the dispensing opening for dispensing the contents of the container.

The insert comprises a disc shaped body section having a top surface, a bottom surface and a guide opening for guiding through the contents of the container.

The top surface of the disc shaped body section defines a substantially flat and annular attachment area, which attachment area extends around the guide opening, and which top surface defines an annular rib that protrudes relative to the substantially flat attachment area and which is located between the attachment area and the guide opening.

The dispensing cap and the insert are configured such that the insert is fixed, preferably clamped, in the inner space of the cap such that the top surface of the insert faces the inside surface of the top wall of the cap and the guide opening of the insert aligns with the dispensing opening in the top wall of the cap.

According to the invention, the dispensing valve is a disc of foil material having a central valve area in which at least one self-closing slits is located and an annular peripheral attachment area extending around the central valve area. The foil type valve is attached to the attachment area of the insert with the attachment area, preferably by way of heat sealing, such that its central valve area aligns with the guide opening of the insert to close off that guide opening. The annular rib offsets the central valve area of the dispensing valve relative to the substantially flat attachment area of the insert.

Providing the insert with a rib element that protrudes relative to the substantially flat attachment area of the insert to offset the central valve area relative to the peripheral valve area allows for straining the valve when being attached to the insert, and thus for using a valve of thin foil material and heat sealing for fixing it to the cap.

Also, securing the valve to an insert to be mounted in a cap allows for using the insert with different types of caps, for example caps with a lid and caps without a lid. This allows for a more flexible production process.

In a preferred embodiment according to the invention, the valve is fixed to the attachment area of the cap or insert, such that it is secured in its position relative to the dispensing opening during use, by way of heat sealing only. No additional securing devices, such as additional clamping rings or transformation of sections of the cap to engage the valve, are needed to secure the valve in its position in the cap.

In an embodiment, the insert with the valve attached to it is positioned with its rib element against the top wall of the cap, such that the foil type vale is pinched between rib and the wall. Thus pinching the valve provides a tight seal between the valve and the inside surface of the top wall of the cap. It is noted that the pinching does not substantially contribute to securing the valve with its central valve are in line with the dispensing opening. The valve is held in position by its connection with the attachment area of the insert.

In an embodiment the valve has a bottom surface that faces the top surface of the insert and a top surface that faces away from the top surface of the insert, and wherein, in a direction perpendicular to the substantially flat attachment area of the insert, the bottom surface of the central area of the valve is located above the top surface of the peripheral area of the valve. In an embodiment according to the invention this distance is at least 0.01 mm larger than the thickness of the valve, preferably is at least 0.05 mm. In a further embodiment, the distance is at least similar to the thickness of the valve, preferably at least 1.5 times the thickness of the valve, for example 2.5 times the thickness of the valve. Providing valve and annular rib element with these dimensions provides a foil type valve heat sealed to the insert, with good valve functions.

In an embodiment the annular rib element of the insert has a height measured from the substantially flat attachment area of the insert, and the foil type valve has a thickness, and the height of the annular rib element is similar to or larger than the thickness of the foil type valve, preferably is at least 1.5 times the thickness of the foil type valve.

In an embodiment, the annular rib element of the insert has a height measured from the substantially flat attachment area of the insert, which height is at least 0.05 mm, preferably is in the range of 0.1 mm-0.5 mm, preferably is at least similar to the thickness of the foil attached to the cap or insert, more preferably is at least 1.5 the thickness of the foil attached to the cap, for example is at least 0.15 mm for example has a height of 0.3 mm.

In a further embodiment, the insert furthermore comprises a cylindrical shaped body section having a central axis, which cylindrical shaped body section defines a dispensing channel extending along said central axis and an access opening at one end of the dispensing channel, and which cylindrical shaped body section is attached to the bottom surface of the disc shaped body section of the insert such that the dispensing channel forms an extension of the guide opening.

This access opening defined by the cylindrical body section can be configured for inserting the neck of the container into the dispensing channel. However, the main purpose of the cylindrical shaped body section is to provide the disc shaped body section with a higher stiffness. In addition to the cylindrical body section, rib elements can be provided between the lateral surface of the cylindrical shaped body section and the bottom surface of the disc shaped body section of the insert to further stiffen up the insert.

In a further embodiment, the disc shaped body of the insert is provided with one or more annular recesses radially outward of the substantially flat and annular attachment area, which one or more recess each function as a resilient hinge that allows for local bending of the disc shaped body of the insert. These one or more annular recesses enable local bending of the disc shaped body section during assembly in the cap, to enable the insert to be secured by way of clamping devices, such as one or more rib elements provided in the inner space of the cap.

In a further embodiment, the annular rib element, when seen in cross section, is trapezium shaped an preferably has a width at its base of at least 0.3 mm, preferably has a width in the range of 0.4 mm-0.8 mm, for example has a width of 0.5 mm, and preferably has a height in the range of 0.1 mm-0.5 mm, for example has a height of 0.3 mm.

It is noted that that the annular rib can also be provided with other types of cross sectional shapes, such as a triangular, rectangular or convex shaped cross section In an embodiment according to the invention, the cap is in its inner space provided with one or more support ribs, which one or more support ribs engage the bottom surface of the disc shaped body of the insert, such that the insert is clamped between the one or more support ribs and the top wall of the cap, and is thus secured in its position adjacent the top wall.

In an embodiment according to the invention, the cap comprises a skirt, witch skirt extends around the cylindrical shaped body section of the cap, to substantially match the cap with the circumference of the container the cap is to be mounted on. In such an embodiment, the inner space of the cylindrical body is configured to engaging the neck part, or a top end thereof, of the container while the skirt is configured to make the outer circumference of the cap match the container, for example the base part of the neck section, or the circumference of the container. Furthermore, the skirt provides the cap with additional stiffness.

In an embodiment according to the invention, the valve is made of polyolefin material, for example a PP material, or of an elastomer material, for example a TPE material. Furthermore, the valve can be a laminate or multi-layer material, i.e. comprise multiple layers of different materials, for example to enhance the valve function or enhance the bonding with the cap or insert.

In an embodiment according to the invention, the valve has a thickness in the range of 0.005-0.6 mm, preferably has a thickness within the range of 0.01-0.5 mm for example has a thickness of 0.05 mm.

It is noted that valves made of PP material preferably have a thickness in the range of 0.01 mm-0.15 mm, for example have a thickness of 0.05 mm, and that valves made of TPE material preferably have a thickness in the range of 0.1 mm-0.5 mm, for example have a thickness of 0.3 mm.

The invention furthermore provides a device for attaching a foil type valve to a cap, or to an insert to be mounted in a cap, to obtain a cap according to the invention. The device comprises a seat and a heat sealing tool.

The seat is configured for positioning and supporting the cap or insert, preferably with the attachment area facing upwards.

The heat sealing tool comprises an annular shaped head configured to engage the annular peripheral attachment area of the foil type valve. The head is movably supported such that it can be moved towards and away from the attachment area of a cap or insert positioned and supported in the seat, for pushing annular peripheral attachment area of a valve contacting the annular rib element of the cap or insert towards the attachment area of the cap or insert. The heat sealing tool is thus configured for heat sealing the attachment area of the valve onto the attachment area of the cap or insert, preferably for pressing the heat sealed part of the valve into the attachment area of the cap or insert during the heat sealing process. The heat sealing tool is configured for heat sealing, for example by way of heat stacking or sonic welding, or for pressing down the valve in combination with a metal foil material and apply induction heating. Other known heat sealing techniques may also be applied within the scope of the invention.

The weld along which the valve is fixed to the cap or insert can be a continuous weld or a discontinuous weld. When the valve is welded onto an insert with a discontinuous weld, the insert is preferably positioned against the bottom surface of the top wall of the cap, such that the valve is pinched between the top wall of the cap and the rib element, and thus a seal is provided, which is beneficial for the valve function of the valve.

Preferably, the weld at which the valve is actually attached to the cap or insert is provided at a minimal distance of the annular rib, and not closely adjacent thereto. In an embodiment according to the invention the distance between weld and annular rib is at least 0.15 mm. Thus the dispensing valve is allowed to gently curve upwards towards the top of the annular rib, which allows for a more even distribution of tension within the valve material. The annular head preferably has a shape similar to the annular rib over which the valve is to be mounted. For example, when the annular rib is circular shaped, the annular head preferably is also circular shaped, and when the annular rib is oval shaped, the annular head is preferably also oval shaped. Thus, the weld with which the valve is secured to the cap is also provided with a shape similar to shape of the annular rib. Thus, the tension in the dispensing valve is more evenly distributed, which is beneficial for the valve function of the valve.

In a further embodiment, the annular head is an annular heat sealing rib, which annular heat sealing rib has a height larger than the height of the annular rib on the cap or insert combined with the thickness of the valve, such that the annular heat sealing rib can press the attachment area of the valve onto, and preferably partially into, the attachment area of the cap or insert during heat sealing, without the heat sealing tool contacting the central part of the valve supported by the annular rib.

By providing the heat sealing tool with an annular head in the form of an annular heat sealing rib of a certain height, the heat sealing tool is provided with a central space for receiving the annular rib of the cap or insert and part of the valve supported by that annular rib of the cap or insert, such that the heat sealing tool, more in particular the annular head of the heat sealing tool, can press part of the attachment area of the valve onto, and preferably partially into, the attachment area of the cap or insert during heat sealing, without the heat sealing tool contacting the central part of the valve supported by the annular rib.

In a further embodiment, the seat is provided with a device for providing negative pressure in the dispensing opening of the cap or the guide opening of the insert supported in the seat, to secure the valve in its position prior to and/or during the heat sealing process.

Thus, with a method according to the invention, a dispensing valve made of foil material is mounted on a cap or insert to be mounted on a cap. The cap or insert is provided with a rib element according to the invention. When the valve is mounted onto the cap or insert, the valve is strained over that rib element. The central valve area of the dispensing valve is thus tensioned by the heat sealing tool when the tool presses the attachment area of the valve towards the cap or insert prior to the heat sealing, and preferably partially into the cap or insert during the heat sealing.

The invention furthermore provides a method for attaching a dispensing valve made of a foil material to a cap or to an insert to be mounted in a cap, to obtain a cap according to the invention, preferably by using a tool according to the invention. The method comprises the steps:

providing a cap or an insert for a closure assembly according to the invention;
positioning and supporting the cap or insert, preferably with its attachment area facing upwards;
providing a dispensing valve for a closure assembly according to the invention;
positioning the dispensing valve on the annular rib element of the cap or insert, such that the dispensing valve contacts the annular rib element of the cap or insert, with the annular peripheral attachment area of the dispensing valve aligned with the annular attachment area of the cap or insert, with the central valve area of the dispensing valve aligned with the dispensing opening of the cap or the guide opening of the insert, and thus with the central valve area of the valve positioned in a staggered position relative to, and preferably parallel with, the substantially flat attachment area of the cap or insert;
pushing the annular peripheral attachment area of the dispensing valve onto the annular attachment area of the cap or insert, thus positioning the attachment area of the valve in a staggered position relative to the central valve area of the valve, and thus straining the central valve area in the process; and
attaching the attachment area of the valve to the annular attachment area of the cap or insert by way of heat sealing, and preferably pressing the part of the attachment area of the valve being heat sealed downward into the attachment area of the cap or insert while heat sealing, thus further straining the central valve area.

Thus, with a method according to the invention, a dispensing valve made of foil material i.e. having a thickness in the range of in the range of 0.005 mm-0.6 mm, is mounted on a cap or insert to be mounted on a cap. The cap or insert is provided with a rib element according to the invention, and the valve is strained over that rib element when mounted onto the cap or insert. The central valve area of the dispensing valve is tightened when its attachment area is pressed down onto, and preferably partially into, the cap or insert during the heat sealing process.

A cap or insert according to the invention is made of plastic material by way of injection molding. A valve according to the invention is made of a thin flexible material, i.e. is cut from a foil. According to the invention the foil type valve is attached to the cap or insert by way of heat sealing, for example by way of heat stacking or sonic welding. These techniques allow for fixing the attachment area of the valve made of flexible foil material to the attachment area of the cap. The heat sealing process generates heat such that local parts of the valve and the cap or insert contacting melt, intermingle and solidify again. Thus the valve is fixed to the cap or insert. It is noted that the valve and cap or insert are bonded along an annular weld, which weld may be narrow compared to the attachment areas of the valve, cap and insert.

With a closure assembly according to the invention, the rib element allows for straining the foil, more in particular allows for providing a radial tension on the central valve area when securing the peripheral attachment area of the valve to the attachment area of the cap or insert during production. The rib element thus prevents buckling of the valve area during the heat sealing process. It has furthermore been found that especially valves of foil material having a thickness of less than 120 μm exhibit good valve behavior, i.e. a valve with good self-closing properties.

Thus the invention provides an alternative closure assembly. Furthermore, a valve made of foil material is can be obtained at low costs compared to injection molded valves. The use of heat sealing to attach the valve to the cap or insert allows for simplified and low cost production compared to the use of clamping rings, two component injection molding, etcetera.

The invention furthermore provides a container, such as a plastic squeeze bottle or a tube, provided with a closure assembly according to the invention.

Further objects, embodiments and elaborations of the apparatus and the method according to the invention will be apparent from the following description, in which the invention is further illustrated and elucidated on the basis of a number of exemplary embodiments, with reference to the drawings.

DETAILED DESCRIPTION

Figure 1:
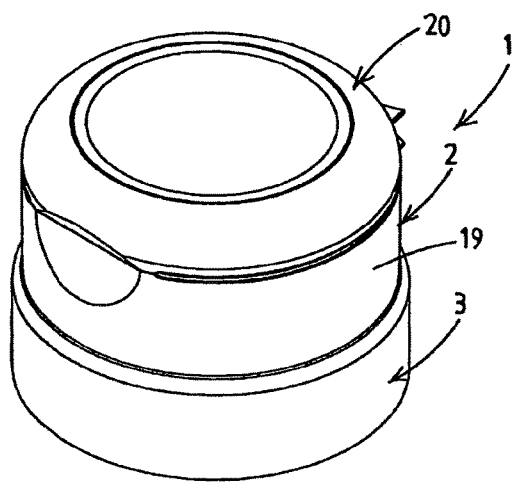
FIG. 1 shows a perspective view of a closure assembly according to the invention provided with a lid and mounted on a neck part of a container.

In FIG. 1 a closure assembly 1 according to the invention is shown in perspective view. The closure assembly 1 comprises a cap 2 and is mounted on a neck 3 of a container (not shown). In the particular embodiment shown, the cap 2 is provided with provided with a lid 20 and a skirt 19. In FIG. 1 the lid 20 is in a closed position in which it closes of a dispensing opening of the cap. The skirt 19 of the cap substantially matches the outer circumference of the neck 3 of the container. It is noted that in FIG. 1 only a base part of the neck 3 is shown. The cap 2 is mounted on a narrow top section of the neck, which is located within an inner space of the cap and thus not visible in FIG.1.

Figures 2, 3:
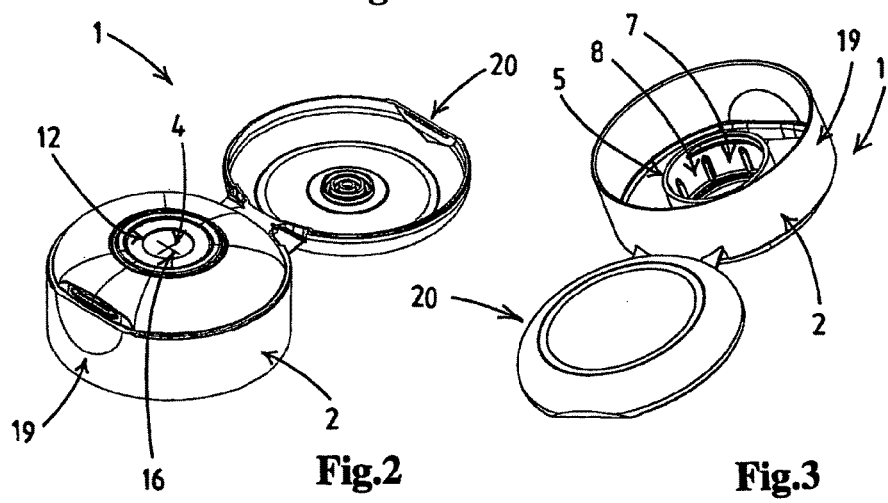
FIG. 2 shows a perspective view of the closure assembly of FIG. 1, with the lid hinged into an open position, from above.
FIG. 3 shows a perspective view of a cap of the closure assembly of FIG. 1, with the lid hinged into an open position, from below.

The closure assembly 1 is shown in perspective view from above in FIG. 2, with the lid 20 of the cap 2 flipped into its open position. With the lid 20 of the cap flipped into its open position, the dispensing opening 12 of the cap 2, which is provided with a dispensing valve 4, is ready for use. FIG. 3 shows in perspective from below the cap of the closure assembly of FIG. 1, with the lid 20 of the cap flipped into its open position.

Figure 4:
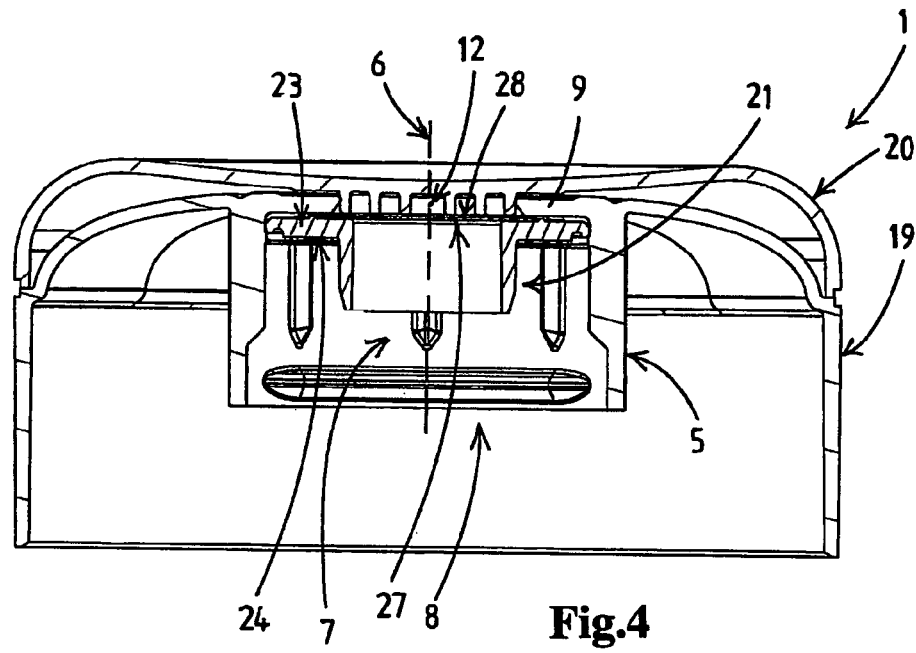
FIG. 4 shows the closure assembly of FIG. 1, in cross section.

FIG. 4 shows the closure assembly 1 of FIG. 1 in cross section. The closure assembly 1 comprises a cylindrical shaped body section 5 having a central axis 6. The cylindrical shaped body section 5 is enclosed by the skirt 19 of the cap. FIG. 4 shows that the skirt 19 of the cap 2 extends around a cylindrical shaped body section 5 of the cap, and thus forms the outer body shape of the cap, to substantially match the outer circumference of the cap with the shape or outer circumference of the container the cap is mounted on.

The cylindrical body section 5 defines an inner space 7 extending along the central axis 6. The cylindrical body section 5 furthermore defines an access opening 8 at one end of the inner space 7 for inserting the neck of the container, more in particular the top end of the neck of the container, into the inner space 6. The cylindrical body section 5 also defines a top wall 9 at an opposite end of the inner space 6, which top wall has an inside surface 10 facing the inner space 6 and an outside surface 11 facing the opposite direction. The top wall 9 is provided with the dispensing opening 12 for dispensing the contents of the container.

Figure 5:
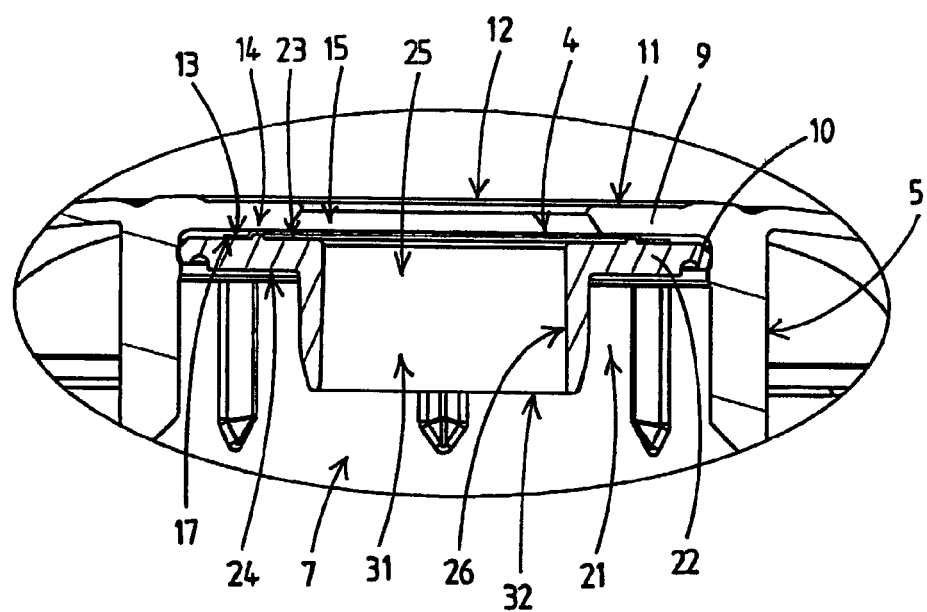
FIG. 5 shows part of the closure assembly of FIG. 1, in cross section and close up.

In the particular embodiment of a closure assembly shown in FIGS. 1-4, the self-closing dispensing valve 4 is attached to an insert 21, which insert 21 is provided in the inner space of the cap 2 such that the valve is located adjacent to the dispensing opening 12 of the cap 2. FIG. 5 shows the dispensing opening 12, the insert 21 and the dispensing valve 4 in close up.

Figures 9, 10:
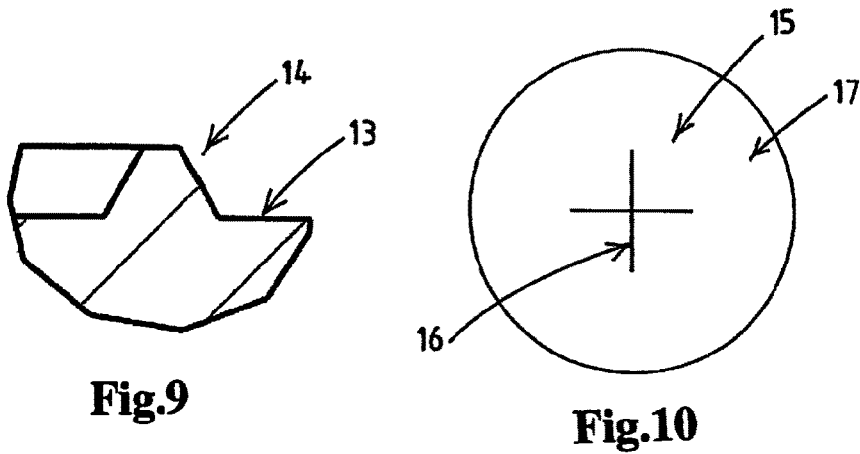
FIG. 9 shows a rib element according to the invention, in cross section.
FIG. 10 shows a dispensing valve according to the invention, from above.

The dispensing valve 4 is shown in isolation in top view in FIG. 10. The dispensing valve 4 is a disc of foil material having a central valve area 15 in which two self-closing slits 16 are located, and an annular peripheral attachment area 17 extending around the central valve area 15.

Figures 6, 7:
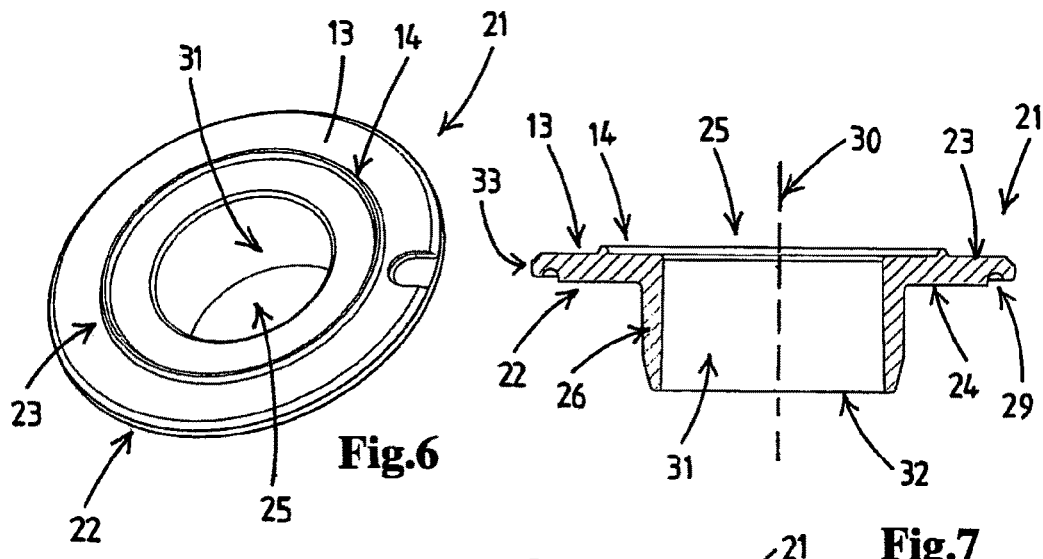
FIG. 6 shows a perspective view of an insert according to the invention, from above.
FIG. 7 shows the insert of FIG. 6, in cross section.

The insert 21 is shown in isolation in perspective view in FIG. 6, and in cross section in FIG. 7. It comprises a disc shaped body section 22 having a top surface 23, a bottom surface 24 and a central guide opening 25 for guiding through the contents of the container.

The top surface 23 of the disc shaped body section 23 of the insert 21 defines a substantially flat and annular attachment area 13, which attachment area extends around the guide opening 25. The dispensing cap 2 and the insert 21 are configured such that the insert is fixed, preferably clamped, in the inner space 7 of the cap such that the top surface 23 of the insert faces the inside surface 10 of the top wall 9 of the cap and the guide opening 25 of the insert aligns with the dispensing opening 12 in the top wall of the cap.

The foil type dispensing valve 4 is with its attachment area 17 attached to the attachment area 13 of the insert 21 such that the central valve area 15 of the valve 4 aligns with the guide opening of the insert to close off that guide opening. Because the guide opening 25 aligns with the dispensing opening 12 of the cap, the central valve area 15 of the valve 4 also aligns with the dispensing opening of the cap 2.

According to the invention, the top surface 23 of the disc shaped body section 22 of the insert 21 furthermore defines an annular rib 14 that protrudes upwards relative to the substantially flat and annular valve attachment area 13. The annular rib 14 is located between the attachment area 13 and the guide opening 25. Therefore, the annular rib 14 offsets the central valve area 15 of the dispensing valve 4 relative to the substantially flat attachment area 13 of the insert in an upward direction, and thus to the peripheral attachment area of the valve. This is for example shown in FIG. 5.

It is noted that in the particular embodiment shown, the insert 21 is positioned with its annular rib element 14 against the inside surface 10 of the top wall 9 of the cap 2, such that the foil type dispensing vale 4 is pinched between rib and the wall. Thus pinching the valve provides a tight seal between the valve and the inside surface of the top wall of the cap. It is noted that the pinching does not substantially contribute to securing the valve with its central valve are in line with the dispensing opening. The valve is held in position by its connection with the attachment area of the insert.

The invention thus provides an alternative closure assembly comprising a cap and a dispensing valve that is a disc of foil material. The rib element enables straining the foil material of the valve when mounted onto the cap and thus allows for using a thin foil material for the valve, which can be sealed to the cap or insert by way of heat sealing.

It is observed that a valve according to the invention is a made of a plastic foil sheet material, and thus is made of a material that is substantially flat, i.e. extends in a plane, and is not shaped or molded like for example a bellow shaped self-closing valve commonly used in the prior art. The foil type or planar diaphragm valve can be made by stamp-cutting a sheet of relatively thin flexible material such as a polyolefin material, for example a PP material, or of an elastomer material, for example a TPE material.

However, it has been found that foil type valves, in particular foil type valves having a thickness less than 0.140 mm, tend to buckle or otherwise transform when attached to the cap or insert using heat sealing, thus losing their valve properties. Providing a cap or insert with an annular rib element according to the invention prevents substantial buckling during the heat sealing process. It has been found that providing a rib element is especially beneficial with valves made of foil type material having a thickness of less than 0.140 mm. Thus the foil is thick enough to provide a functioning self-closing valve, and is thin enough to enable fixing the valve to the cap or insert by way of heat sealing. Furthermore, a valve made of such a foil material adapts well to being offset by the annular rib element according to the invention.

In an embodiment according to the invention, the valve is made of a foil material having a thickness in the range of 0.01-0.1 mm, for example having a thickness of 0.06 mm, preferably having a thickness in the range of 0.04-0.06 mm, for example having a thickness of 0.05 mm. Providing a closure assembly according to the invention with a valve made of a foil material of this thickness provides a valve with good self-closing properties.

In the embodiment shown in the FIGS. 1-5, the valve 4 has a bottom surface 27 that faces the top surface 23 of the insert 21 and a top surface 28 that faces away from the top surface of the insert. In a direction perpendicular to the substantially flat attachment area 13 of the insert 21, the bottom surface 27 of the central area 15 of the valve 4 is located above the top surface 28 of the peripheral attachment area 17 of the valve. This is for example shown in FIG. 5. In the embodiment shown the valve is made of a PP material having a thickness of 0.05 mm.

In an embodiment according to the invention this distance between the bottom surface of the central area of the valve and the peripheral attachment area of the valve, measured perpendicular to the surface of the valve, is larger than the thickness of the valve, preferably is larger than 0.05 mm. In a further embodiment, the distance is at least 1.5 times the thickness of the foil material the valve is made of, for example 2.5 times the thickness of the foil material h a valve is made of. Providing valve and annular rib element with these dimensions provides a foil type valve heat sealed to the insert, with good valve functions.

Furthermore, as is shown in FIG. 7, the annular rib element 14 of the insert 21 has a height measured from the substantially flat attachment area of the insert of 0.3 mm. According to the invention, the height of the annular rib element preferably is at least similar to, or larger than, the thickness of the foil type valve, preferably is at least 1 times the thickness of the foil type valve.

In the particular embodiment shown in FIGS. 3-6, the insert 21 comprises a cylindrical shaped body section 26 having a central axis. It is noted that in the preferred embodiment shown, the central axis 30 of the cylindrical shaped body section 26 of the insert 21 coincides with central axis 6 of the cylindrical shaped body section 5 of the cap 2. The cylindrical shaped body section 26 of the insert 21 defines a dispensing channel 31 extending along said central axis 30 and an access opening 32 at one end of the dispensing channel. The cylindrical shaped body section 26 is attached to the bottom surface of the disc shaped body section 22 of the insert 21 such that the dispensing channel 31 forms an extension of the guide opening 25.

It is observed that a cap, more in particular the inner space of the cap, is dimensioned to receive the neck part of a container, and to fit that neck part such that the contents of the container dispensed via the neck part will be guided via the inner space of the cap to and through the dispensing opening of the cap. To enable a certain cap to be used with different containers, i.e. with containers that differ in the shape and/or dimensions of the neck part, an adapter can be provided in the inner space of the cap. The adapter is essentially a tube that is dimensioned such that one end of the fits the neck part of a particular container, and the other end fits the inner space of the cap. Thus, the use of inserts enables the cap to be mounted on different tubes. Thus, the access opening 32 defined by the cylindrical body section 26 of the insert 21 can be configured for inserting the neck of the container into the dispensing channel 30. In this way, the insert can be used as an adapter element that allows for mounting the closure assembly on a neck part of a container that is too narrow to correctly fit the access opening of the inner space of the cylindrical body section of the cap. The use of inserts for adapting caps is as such known in the prior art, and will therefore not be elaborated upon. However, the main purpose of the cylindrical shaped body section of the insert is to provide the disc shaped body section with a higher stiffness.

Figure 8:
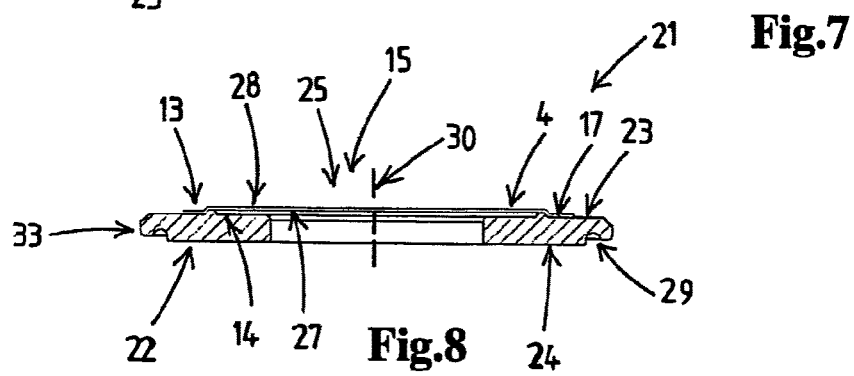
FIG. 8 shows an alternative insert with valve according to the invention, in cross section.

FIG. 8 shows an alternative insert 21 according to the invention, which only comprises the disc shaped body section 22. The insert shown in FIG. 8 is provided with a valve 4. The insert and the valve shown in FIG. 8 are provided with the same reference signs for those elements that have also been indicated with the insert disclosed and valve shown in FIGS. 4-7. Both inserts shown are configured to be clicked into position in the inner space of the cap. To enable the inserts to be clicked into position, a cap is in its inner space provided with one or more support ribs, which one or more support ribs engage the bottom surface of the disc shaped body of the insert, such that the insert is clamped between the one or more support ribs and the top wall of the cap, and is thus secured in its position adjacent the top wall. Typically, the insert and/or the one or more rib elements are configured to allow for resilient local deformation while the insert is pushed into position.

For example, the insert 21 shown in FIGS. 6-7 and the alternative insert 21 shown in FIG. 8, are provided with an annular recess 29 radially outward of the substantially flat and annular attachment area 13. The recess functions as a resilient hinge that allows for local bending of the disc shaped body of the insert, more in particular of the outer rim 33 of the insert. The annular recess enables local bending of the disc shaped body section during assembly in the cap, to enable the insert to be pushed beyond one or more rib elements provided in the inner space of the cap.

In the particular embodiment 1 shown in FIGS. 1-5, the cap 2 is provided with an annular rib element 34 extending along the inner surface of the cylindrical body section 5. During assembly, the insert 21 is pushed into the inner space 7 and beyond the annular rib element 34. Once beyond the rib element 34, the flexible part of the insert 21 flexes outward again, and the insert is clamped between the inside surface 10 of the top wall 9 and the annular rib element 34. It is noted that the insert can be secured by way of other clamping devices, such as click fingers, a recess, etc. as well. Known techniques for clamping prior art inserts in a cap may also be used with a cap and insert according to the invention.

In a further embodiment according to the invention, the lateral surface of the disc shaped body section of the insert can be provided with recesses, protrusions, click fingers, etc. that cooperate with complementary shaped provided in the inner space of the cap to secure the insert in position.

Figure 11:
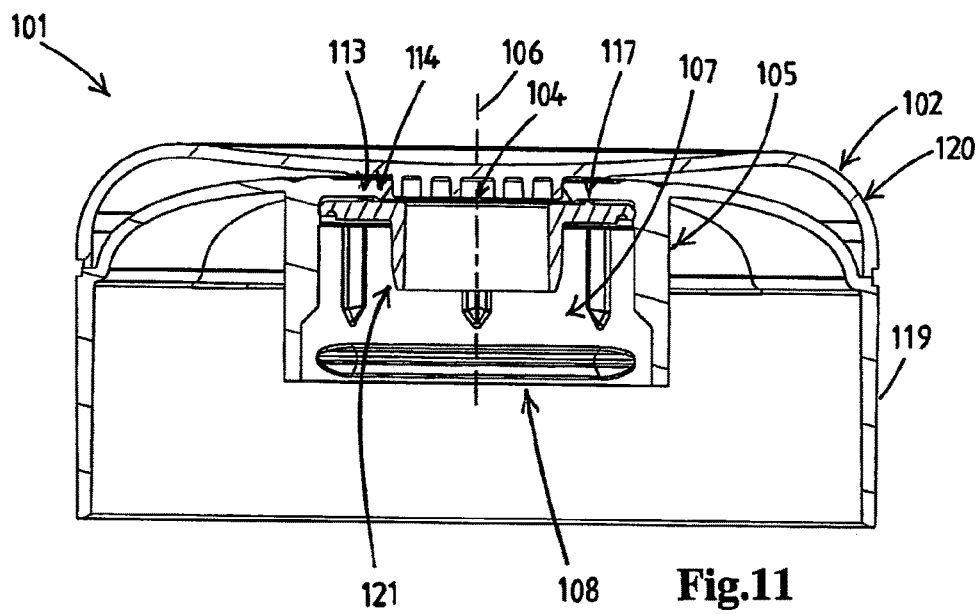
FIG. 11 shows an alternative closure assembly according to the invention, in cross section.
Figure 12:
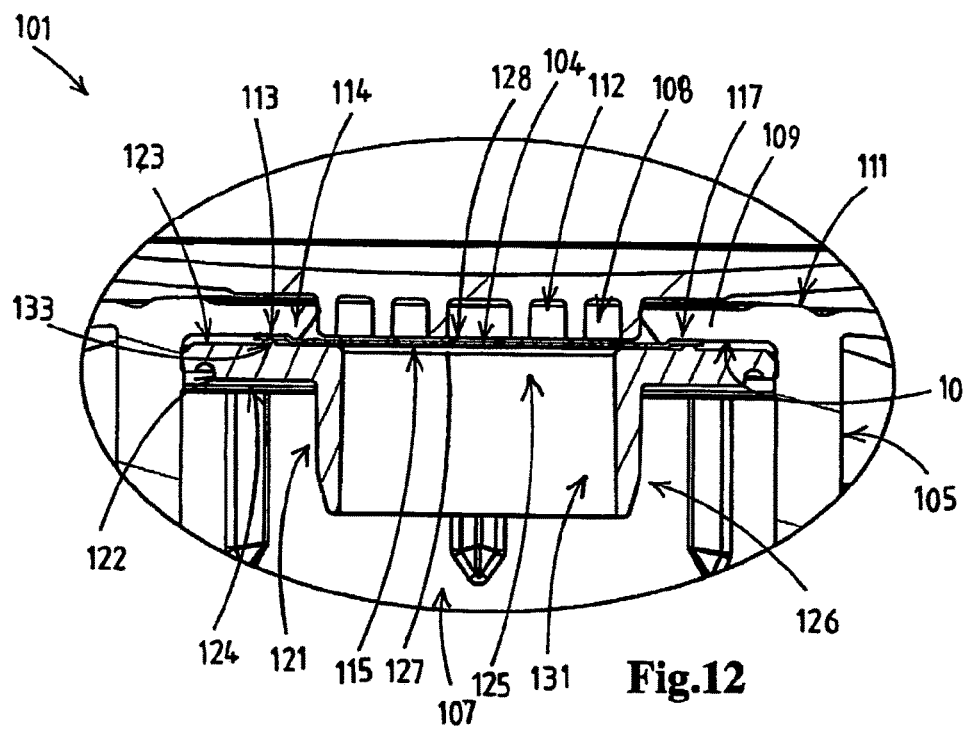
FIG. 12 shows part of the alternative closure assembly of FIG. 11, in cross section in close up.
Figure 13:
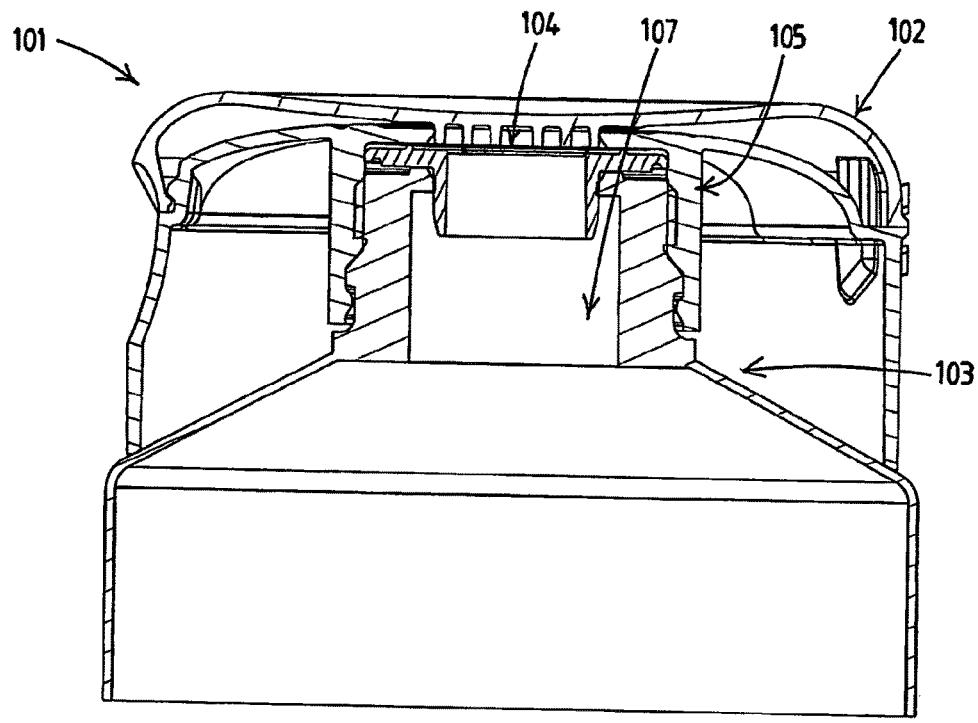
FIG. 13 shows the closure assembly of FIG. 11 mounted on a neck part of a container, in cross section.

FIG. 11 shows an alternative embodiment of a closure assembly 101 according to the invention. The closures assembly 101 also has a cap 102 and a dispensing valve 104 located adjacent a dispensing opening 112 of the cap, and is also configured to be mounted on a neck 103 of a container. It however differs from the embodiment 1 shown in the preceding Figs. in that the self-closing dispensing valve 104 is attached to the cap 102 and not too an insert. FIG. 12 shows part of the alternative closure assembly of FIG. 11, in cross section in close up. FIG. 13 shows the closure assembly of FIG. 11 mounted on a neck part of a container, in cross section.

The dispensing cap 102 comprises a cylindrical shaped body section 105 having a central axis 106, which cylindrical body section defines an inner space 107 extending along said central axis, an access opening 108 at one end of the inner space 107 for inserting the neck 103 of the container into the inner space, and a top wall 109 at another end of the inner space 107. The top wall 109 has an inside surface 110 facing the inner space 107 and an outside surface 111 facing the opposite direction. The top wall 109 is provided with the dispensing opening 112 for dispensing the contents of the container on which the closure assembly is mounted.

The inside surface 110 of the top wall 109 defines a substantially flat and annular attachment area 113, which attachment area extends around the dispensing opening 112. The inside surface 110 furthermore defines an annular rib 114, which annular rib is located between the attachment area 113 and the dispensing opening 112. The rib 114 protrudes relative to the substantially flat attachment area 113 of the cap 102, similar to the rib 14 protrudes relative to the substantially flat attachment area 13 of the insert 2 depicted in FIGS. 1-5. It is noted however that the rib provided on the cap protrudes in the downward direction while the rib provided on the insert protrudes upward. Both position the central valve area adjacent the dispensing opening of the cap.

The dispensing valve 104 is again a disc of foil material having a central valve area 115 in which at least one self-closing slit 116 is located, and having an annular peripheral attachment area 117 extending around the central valve area 117. It is noted that a valve of foil material fit for attachment to the cap is also fit for attachment to the insert.

The dispensing valve 104 is with its attachment area 117 attached to the attachment area 113 of the dispensing cap 102 by way of heat sealing, such that its central valve area 115 aligns with the dispensing opening 112 of the dispensing cap 102 to close off that dispensing opening. Furthermore, according to the invention, the annular rib 114 offsets the central valve area 115 of the dispensing valve 104 relative to the substantially flat attachment area 113 of the cap 102.

In the particular embodiment shown, the annular rib element 114 of the cap 102 is provided adjacent the dispensing opening 112, such that the rib element partially defines the insert opening. It is also possible to provide the rib element in a more radial outward direction. However by providing the rib element adjacent the insert opening there is no room between the valve and the bottom surface of the top wall of the cap in which content of the container could accumulate during use. Such accumulation of content may lead cause non hygienic conditions.

Typically, the annular rib element 114 of the cap 102 has a height measured from the substantially flat attachment area 113 of the cap 102, which height in the embodiment shown is 0.3 mm. The dispensing valve 104 is made of a foil material having a thickness of 0.05 mm.

As set out with respect to the earlier embodiment 1, the valve 104 has a top surface 128 that in this particular embodiment faces the top wall 109 of the cap 102 and a bottom surface 127 that in this particular embodiment faces away from the top wall 109 of the cap 012. In a direction perpendicular to the substantially flat attachment area 113 of the cap 102, the top surface 128 of the central area 115 of the dispensing valve is located below the bottom surface 127 of the peripheral area 117 of the dispensing valve 104. In the embodiment shown, the offset distance between the top surface 128 of the central valve area 115 and the bottom surface 127 of the peripheral attachment area 117 of the valve 104 is 0.25 mm.

Alternatively, the annular rib element 114 of the cap 102 has a height measured from the substantially flat attachment area 113 of the cap 102, and the foil type dispensing valve 104 has a thickness, and the height of the annular rib element is similar to, or larger than, the thickness of the foil type dispensing valve. In a preferred embodiment, height of the rib element is at least 1.5 times the thickness of the dispensing valve. In the particular embodiment shown, the height of the rib element is 0.3 mm and the dispensing valve as a thickness of 0.05 mm. The height of the rib element is thus 6 times the thickness of the dispensing valve.

In the embodiment of a closure assembly 101 according to the invention shown in FIGS. 8 and 9, the cap 102 is provided with an insert 121 to adapt the inner space 107 of the cap 102 to the neck element 103 of the container (not shown).

The insert 121 comprises a disc shaped body section 122, having a top surface 123, a bottom surface 124 and a guide opening 125. The insert 121 further comprises a cylindrical shaped body section 126 having a central axis 130, which cylindrical insert body section defines a dispensing channel 131 extending along said central axis and an access opening 132 at one end of the dispensing channel for inserting the neck of the container into the dispensing channel. The cylindrical shaped body section 126 of the insert is attached to the bottom surface 127 of the disc shaped body section 122 of the insert 121 such that the dispensing channel 131 forms an extension of the guide opening 125. The dispensing channel 131 and the guiding opening 125 together form a conduit for guiding contents from a neck section of the container received in the access opening 132 towards the dispensing valve 104 located adjacent the dispensing opening 112 of the cap 102. The insert thus forms an adapter configured to fit the neck part of a particular container in the inner space 107 of the cap 102.

In the particular embodiment shown, the top surface 123 of the insert 121 furthermore defines an annular rib element 133 that protrudes relative to top surface 123 of the adapter type insert and which rib and that extends around the guide opening. This rib element is provided not to secure the valve in its position relative to the dispensing opening. Because the dispensing valve is already attached to the cap, additional securing devices are not necessary. The rib element does however pinch the valve to thus provide a seal between insert and cap.

The annular rib element 133 of the insert 121 has a height measured from the top surface 123 of the disc shaped body section 122 of the insert 121. The annular rib element 114 of the cap 102 has a height measured from the substantially flat and annular attachment area 113 of the top wall 109 of the cap 102. It is noted that the height of the annular rib element 133 of the insert 121 is greater than the height of the annular rib element 133 of the cap 102 to at least such an extent that the rib element 133 of the insert 121 keeps the top surface 123 of the disc shaped body 122 of the insert 121 spaced apart from the annular rib element 114 of the cap 102 and the dispensing valve 104 supported by that rib element 114.

FIG. 9 shows a rib element according to the invention, for example similar to the annular rib 14 of the closure assembly shown in FIGS. 1-5, in detail in cross section. In this particular embodiment, the rib is trapezium shaped, i.e. has a trapezium shaped cross section, with a width at the base of 0.5 mm, a width at the top of 0.15 mm, and a height of 0.3 mm.

FIG. 10 a dispensing valve according to the invention, for example similar to the valve 4 of the closure assembly shown in FIGS. 1-4, from above. A valve according to the invention preferably has a thickness in the range of 0.01-0.1 mm, preferably within the range of 0.04-0.06 mm. In the particular embodiment shown, the dispensing valve has a thickness of 0.05 mm.

A dispensing valve according to the invention is preferably made of polyolefin material, for example a PP material, or of an elastomer material, for example a TPE material. Tests have shown that valves mad of these types of foil material function especially well within a closure assembly according to the invention. It is noted that valves made of a PP material preferably have a thickness in the range of 0.01 mm and 0.15 mm, for example have a thickness of 0.1 mm. Valves made of a TPE material preferably have a thickness in the range of 0.1 mm and 0.5 mm, for example have a thickness of 0.3 mm.

It is noted that an annular rib according to the invention preferably has a height at least similar to and preferably more than the thickness of the foil the valve is made off. For example, when the foil material of the valve has a thickness of 0.05 mm, the rib element has a height of at least 0.05 mm, preferably of more than 0.05 mm. Thus, the central valve will be off set over a distance of at least the thickness of the valve.

The invention furthermore provides a device for attaching a foil type valve to a cap, or to an insert to be mounted in a cap, to obtain a cap according to the invention. Such a device is partially shown in FIG. 14, and comprises a seat (240) and a heat sealing tool 235. The seat is configured for positioning and supporting the cap or insert, preferably with the attachment area facing upwards. Thus, the foil type valve can be placed upon the annular rib element of the seat or cap held by the seat. It is noted that a valve according to the invention is preferably made of a foil material which has a stiffness such that the valve when placed upon the annular rib element of the cap or insert does not bend under its own weight, but keeps its sheet like form and thus substantially extends in a plane.

Figure 14:
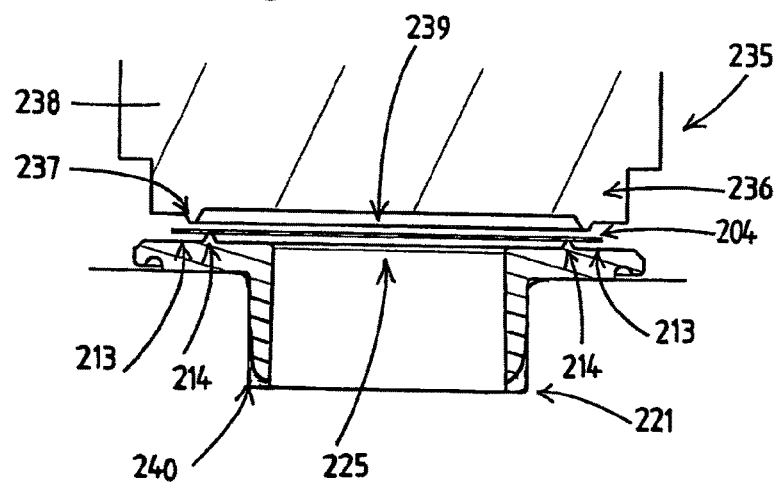
FIG. 14 shows a perspective view of a device for providing a closure assembly according to the invention.

FIG. 14 shows an insert 221 according to the invention held in a seat (240). A foil type valve 204 is positioned on an annular rib element 214 according to the invention, such that its central valve area 215 is aligned with the guide opening 225 of the insert 221, and its annular peripheral attachment area 217 is aligned with the attachment area 213 of the insert 221. The dispensing valve 221 is made of a foil material which has a stiffness such that the valve does not bend under its own weight, but keeps its sheet like form and thus substantially extends in a plane, in which condition it is shown in the Fig.

The heat sealing tool 235 comprising an annular shaped head, in the particular embodiment shown in the form of an annular rib element 237 that is provided on a cylindrical carrier head 238. The annular shaped head 237 is configured to engage the annular peripheral attachment area 217 of the foil type valve. It is noted that the annular head contacts the attachment area of the valve indirectly, because it contacts the top surface of the valve while the actual attachment area is located on the bottom surface of the valve. However, in the context of this document, it is to be understood that the annular shaped head thus engages the attachment area of the valve.

The heat sealing tool 237, 238 is movably supported such that it can be moved towards and away from the attachment area of a cap or insert positioned and supported in the seat. Thus the head can be moved towards the insert, i.e. in a downward direction in FIG. 14, for pushing the annular peripheral attachment area 217 of a valve 204 towards the attachment area 213 of the insert 221. By thus moving the peripheral part of the valve towards the insert, the central part of the valve, i.e. the valve area, is strained over the rib element. When the attachment area 217 of the valve 204 contacts the attachment area 213 of the insert 221, the annular head 237 heat seals the valve 204 to the insert 221, thus mounting the valve onto the insert. In a further embodiment, the heat sealing tool presses the part of the valve being heat sealed to the insert into the attachment area of the cap or insert during the heat sealing process to further strain the central valve area of the valve during the heat sealing process.

Thus, the valve 204 insert 221 are bonded along an annular weld which in shape and dimension is similar to the annular head 237 of the heat sealing tool 236. It is noted that in the embodiment shown, the annular head 237, and thus the weld along which the valve and insert are bonded, is narrow compared to the attachment areas of the respective valve and insert.

It is noted that the same type of device can be used for heat sealing a valve to the insert as for heat sealing a valve to a cap by changing the seat to support either the cap or insert.

The heat sealing tool according to the invention is configured for heat sealing the attachment area of the valve to the attachment area of the cap or insert, while pressing the attachment area of the valve against the attachment area of the cap or insert, It is noted that the annular head of the heat sealing tool according to the invention can be configured in many ways. In the embodiment shown, the annular head 237 is an annular heat sealing rib, which annular heat sealing rib 237 is mounted on a cylindrical carrier head 238. Alternatively, the head for example has a tubular or ring shape.

The heat sealing rib 237 has a height larger than the height of the annular rib 214 on the insert 221 combined with the thickness of the valve 204. Thus, the heat sealing tool 236 is provided with a central space 239 for receiving the annular rib 214 of the insert 221 and part of the valve 204 supported by that annular rib of the insert. Thus, the heat sealing tool 236, more in particular the annular head 237 of the heat sealing tool, can press part of the attachment area 217 of the valve onto, and partially into, the attachment area 213 of the insert 221 during heat sealing, without the heat sealing tool contacting the central part of the valve supported by the annular rib.

In a further embodiment of a device according to the invention, the seat is provided with a device for providing negative pressure in the dispensing opening of the guide opening of the insert supported in the seat, to secure the valve in its position prior to and/or during the heat sealing process.

In an embodiment of the heat sealing tool according to the invention, the heat sealing tool is provided with an additional heat sealing surface on the inside of the annular heat sealing rib for additionally sealing the valve to the top of the annular rib of the cap or insert after the valve has been sealed to the attachment surface of the cap or insert. This is achieved by moving the heat sealing tool further towards the cap or insert such that the additional heat sealing surface contacts the part of the valve located directly on top of the rib to seal it to the top of the rib. It is noted that also in this embodiment, the heat sealing tool is preferably provided with a central space, similar to the central space 239 shown in FIG. 14, such that the heat sealing tool, more in particular the annular head of the heat sealing tool, can press parts of the valve onto, and partially into, the cap or the insert during heat sealing, without the heat sealing tool contacting the central part of the valve. Thus, the central valve area can not be damaged by the heat sealing tool during the heat sealing process. A closure assembly provided with such a heat sealing tool, has a valve that is attached to the cap or insert both at the attachment area and at the top of the annular rib of the cap or insert. Thus the valve is extra securely fixed in its position.

In an embodiment of the heat sealing tool according to the invention, the heat sealing tool is provided with an additional push surface on the outside of the annular heat sealing rib, which push surface is configured for pushing down any material that is pushed upward by the annular heat sealing rib while heat sealing the valve to the attachment surface. The purpose of the push surface is to keep the attachment surface of the cap or insert located adjacent the heat sealing area substantially flat, i.e. to prevent the heat sealing process, in particular the heat sealing rib being pressed into the attachment area of the cap or insert during the heat sealing process, from creating protuberances in the attachment area directly adjacent the groove, in which groove the valve is attached to the attachment area.

The invention furthermore provides a method for attaching a valve made of a foil material to a cap or to an insert to be mounted in a cap, to obtain a cap according to the invention preferably by using a tool according to the invention. The method comprises the following steps.

Providing a cap or an insert for a closure assembly according to the invention, .i.e. a cap provided with a rib element that enables straining the valve, more in particular the central valve area of the valve, while being attached to the cap or insert.

Positioning and supporting the cap or insert, for example in a seat or similar positioning device. Preferably the cap or insert is positioned with its attachment area facing upwards, such that gravity may help in keeping the valve in its position.

Providing a dispensing valve for a closure assembly according to the invention, i.e. a dispensing valve made of a foil type material and preferably having a thickness in the range of 0.01 mm-0.05 mm, and for example made of a PP or TPE material.

Positioning the dispensing valve on the annular rib element of the cap or insert, such that the dispensing valve contacts the annular rib element of the cap or insert, with the annular peripheral attachment area of the dispensing valve aligned with the annular attachment area of the cap or insert, with the central valve area of the dispensing valve aligned with the dispensing opening of the cap or the guide opening of the insert, and thus with the central valve area of the valve positioned in a staggered position relative to, and preferably parallel with, the substantially flat attachment area of the cap or insert. Additional devices can be provided for securing the valve in its position on the cap or insert, for example a vacuum device, or a device that sues static electricity to hold the valve, etc.

Pushing the annular peripheral attachment area of the dispensing valve onto the annular attachment area of the cap or insert, thus positioning the attachment area of the valve in a staggered position relative to the central valve area of the valve, and thus straining the central valve area in the process.

Attaching the attachment area of the valve to the annular attachment area of the cap or insert by way of heat sealing, for example by way of heat stacking or sonic welding, preferably pressing the part of the attachment area of the valve being heat sealed into the attachment area of the cap or insert while heat sealing, thus further straining the central valve area.

Figure 15:
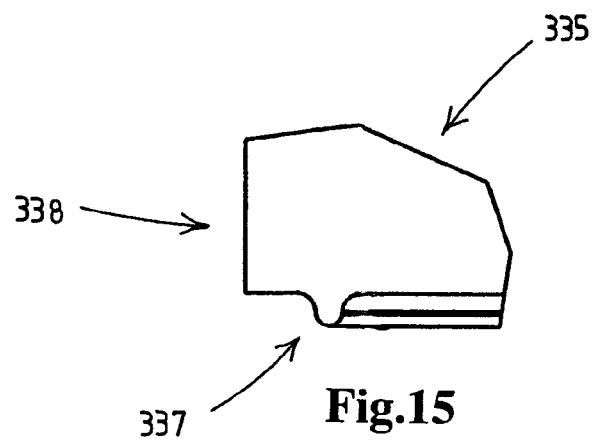
FIG. 15 shows a side view in cross section of a device for providing a closure assembly according to the invention having a rib with a spherical shaped cross section.

FIG. 15 partially shows a side view in cross section of an alternative device according to the invention, i.e. a device for attaching a foil type valve to a cap or to an insert to be mounted in a cap to obtain a cap according to the invention. As was explained here above, the device comprises a heat sealing tool 335, for example a sonotrode for ultrasonic welding, having an annular shaped head. In the exemplary embodiment shown in FIG. 15, the annular shaped head has the form of an annular rib element 337 that is provided on a cylindrical carrier head 338.

In a preferred embodiment, of which a detail is shown in FIG. 15, the rib element 337 has a substantially spherical cross section. By providing the rib with such a cross section, upon first contact between the rib element and the annular peripheral attachment area 217 of the foil type valve, the ring shaped contact area between rib and valve is small. However, when the valve is pushed downward, and into the attachment area of the cap or insert, the contact area between rib and valve increases, which provides for an optimal energy transfer between heat sealing tool and valve.

Figure 16:
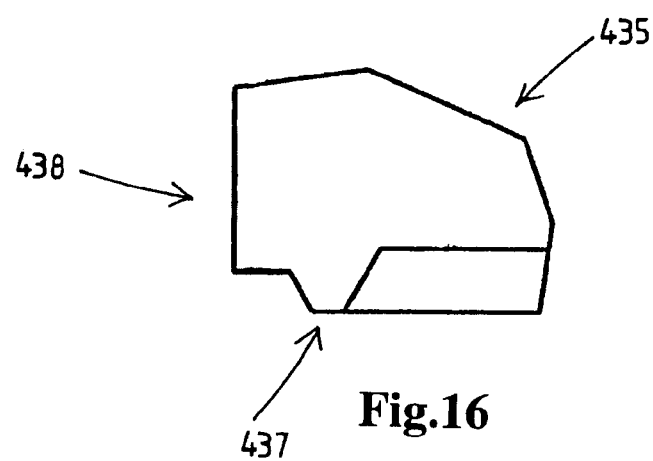
FIG. 16 shows a side view in cross section of a device for providing a closure assembly according to the invention having a rib with a trapezium shaped cross section.

In an alternative embodiment according to the invention, shown in FIG. 16, the annular shaped head has the form of an annular rib element 437 that is provided on a cylindrical carrier head 438, and the rib element 437 has a trapezium shaped cross section. In a further alternative embodiment, the rib element has a substantially triangular shaped cross section.

It is observed that in the embodiments of a closure assembly according to the invention shown, the attachment area of the insert and cap extends in a plane perpendicular to the central axis of the cylindrical body section of the cap. In alternative embodiments, the attachment area extends in a plane that is at an angle with the central axis. For example, the cap can be provided with a slanted top wall of which the inside surface is at an angle with the central axis of the cylindrical body section.

In the embodiments shown, dispensing valve, annular rib, insert, dispensing opening etc. have been depicted with a circular shape. It is noted that other shapes can also be applied, for example, the annular rib and valve can be provided with an elongate, for example oval shape, the dispensing opening can be rectangular, etc.

Figure 17:
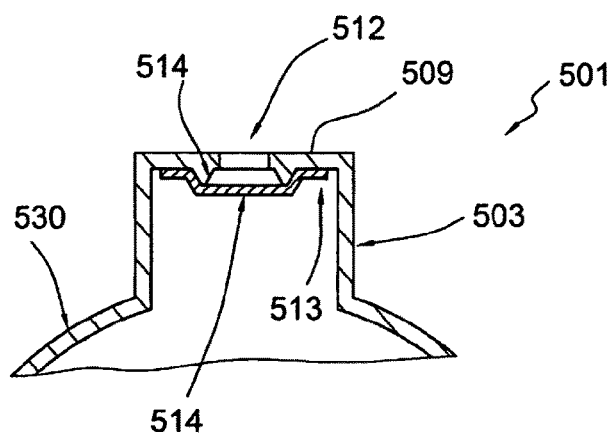
FIG. 17 shows a first exemplary embodiment in cross section of a closure assembly according to a further aspect of the invention.
Figure 18:
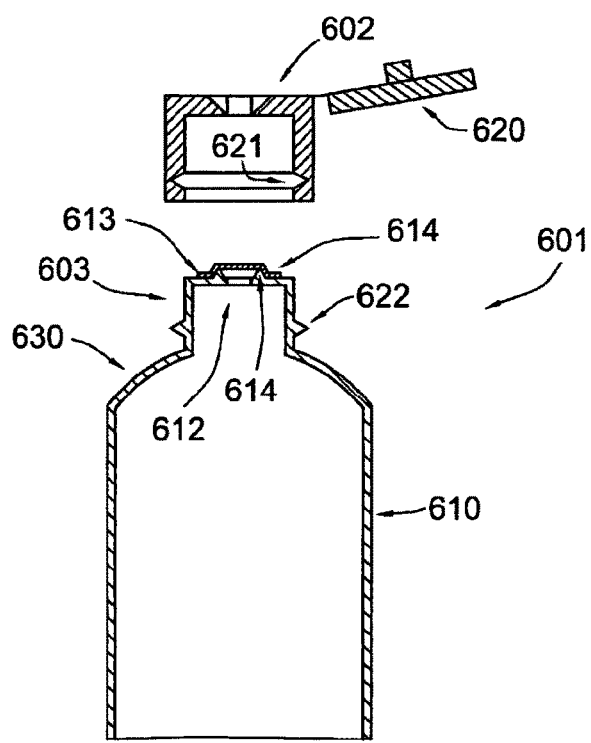
FIG. 18 shows a second exemplary embodiment in cross section of a closure assembly according to a further aspect of the invention.

FIG. 17 and FIG. 18 shows a first exemplary embodiment 501 and a second exemplary embodiment 601 in cross section of a closure assembly according to a further aspect of the invention.

According to the further aspect, the invention provides a closure assembly 501, 601 according to claim 26 or 27 and a container according to claim 30. According to this aspect of the invention, the closure assembly 501,601 is part of a container 610, or is configured to be part of a container, and comprises a neck part 503, 603 with a dispensing opening 512,612, a self-closing dispensing valve 504, 604 attached to a substantially flat attachment area 513,613 of the neck part 503,603 such that it is located adjacent the dispensing opening, and an annular rib 514,614 that offsets the central valve area of the dispensing valve relative to the substantially flat attachment area of the neck part.

Therefore, in the final product, the neck part, and thus the annular rib element and the attachment area provided on the neck part, are an integral part of the container. Furthermore, in the final product, the self-closing dispensing valve is attached to an integral part of the container.

When the self-closing valve is mounted on a ring that is to be clamped in a cap, it is necessary to make sure that the ring, during or after inserting the ring in the cap, is not subjected to clamping forces that change the shape of the ring to such an extent that this has a negative effect on the sealing effect of the sealing valve.

When the self-closing valve is mounted on the on the inside of the cap, or on an ring provided in the cap, it is necessary to make sure that the cap is mounted on the neck part of the container such that there is no leakage between valve and container.

By attaching the self-closing valve on the neck part of a container, according to the further aspect of the invention, there are no clamping forces need to secure the self-closing dispensing valve in its position, and the risk that the self-closing dispensing valve is bend out of shape and/or that leakage occurs is reduced.

The closure assembly according to the further aspect of the invention is in particular suitable for use with plastic squeezable tubes and similar containers.

Plastic squeezable tubes are known from the prior art, and are used for some time for dispensing fluid materials such as hand lotions, shampoos, toothpaste, cream, gel, cosmetics, or similar products. A typical squeezable plastic tube comprises a sleeve body having flexible walls and a shoulder comprising a neck with a dispensing opening. The shoulder is more rigid than the flexible thin walled sleeve body. To dispense the product held in the tube, the sleeve body is squeezed such that the product is forced through the dispense opening.

Plastic squeezable tubes and containers are made by combining a shoulder part, comprising a base and a neck part, with a tubular container body. Alternatively, the shoulder part, comprising a base and a neck part, is injection moulded as an integral body with the tubular container body.

In both cases, a flexible tube body comprising a top end with the shoulder and an open opposite end is provided. The open end is sealed in a subsequent process step, most often by heat sealing or ultrasonic welding. Typically, prior to sealing the tube body, the tube is filled via the open end with the product to be dispensed.

Tubes are provided with a self-closing valve to seal off the dispense opening, to protect against spillage and to protect the product held in the tube for example from dehydration.

The closure assembly 501 shown in FIG. 17 comprises a neck part 503 that is at its lower end provided with a skirt 530, the skirt extending in the radial direction, such that the neck part 503 and skirt 520 form a shoulder body that is configured to be part of a container, for example is configured to be combined with a tubular sleeve body to form a squeeze tube. It is observed that it is generally known to combine a pre-produced neck/skirt-part, also known as shoulder, with a tubular sleeve body to form a tube. Shoulder and tubular sleeve body can for example be combined by way of heat sealing.

In the embodiment shown in FIG. 17, the rib element 514 and self-closing dispensing valve 504 are provided on the inside surface of the neck element 503, more in particular on the inside surface of a top wall of the neck element.

It is noted that the shoulder depicted in FIG. 17 can be configured for receiving a similar cap.

The closure assembly 601 shown in FIG. 18 comprises a neck part 603 that is at its lower end provided with a skirt 630, the skirt extending in the radial direction. In the embodiment shown, the skirt 630 is an integral part of a tubular shaped container body 610. Such a combined neck, shoulder and tubular body can be obtained by injection moulding.

In the embodiment 601 shown in FIG. 18, the rib element 614 and self-closing valve 613 are provided on the outside surface of the neck element 603. FIG. 18 furthermore depicts a cap 602 in cross section, which cap is configured to be placed over the neck part 603, such that the neck part is received within the cap. The cap 602 is provided with a circumferential recess 621 that clicks over a circumferential rib 622 provided on the neck part to secure the cap in its position. The cap 602 furthermore comprises a lid 620 for closing of the dispensing opening in the cap, and thus the dispensing opening in the neck element.

It is noted that FIGS. 17 and 18 schematically depict exemplary embodiments according to a further aspect of the invention for clarification purposes only, and do not limit the scope invention in any way.

The invention is by no means limited to the exemplary embodiment described herein above, but comprises various modifications hereto, in so far as they fall within the scope of the following claims. Other variations to the disclosed embodiments can be understood and effected by those skilled in the art in practicing the claimed invention, from study of the drawings, the disclosure, and the appended claims. In the claims, the word "comprising" does not exclude other elements or steps, and the indefinite article "a" or "an" does not exclude a plurality. Any reference signs in the claims should not be construed as limiting the scope.

The invention claimed is:

1. A closure assembly configured to be mounted on a neck of a container, said closure assembly comprises a cap with a dispensing opening, and a self-closing dispensing valve attached to the cap such that said self-closing dispensing valve is located adjacent the dispensing opening, and wherein the cap comprises a cylindrical shaped body section having a central axis, wherein said cylindrical body section defines an inner space extending along said central axis, an access opening at one end of the inner space for inserting the neck of the container into the inner space, and a top wall at another end of the inner space, wherein said top wall has an inside surface facing the inner space and an outside surface facing an opposite direction, and wherein said top wall is provided with the dispensing opening for dispensing contents of the container, and wherein the inside surface of the top wall defines a substantially flat and annular attachment area, wherein said attachment area extends around the dispensing opening, and wherein said inside surface defines an annular rib, wherein said annular rib is located between the attachment area and the dispensing opening, wherein said annular rib protrudes relative to the substantially flat attachment area;

the dispensing valve is a disc of foil material having a central valve area in which at least one self-closing slit is located and an annular peripheral attachment area extending around the central valve area, wherein with said annular peripheral attachment area the dispensing valve is attached to the attachment area of the cap, such that the central valve area aligns with the dispensing opening of the cap to close off the dispensing opening, and wherein the annular rib offsets the central valve area of the dispensing valve relative to the substantially flat attachment area of the cap.

2. A closure assembly according to claim 1, wherein the annular rib of the cap is provided adjacent to the dispensing opening.

3. A closure assembly according to claim 1, wherein the valve has a top surface that faces the top wall of the cap and a bottom surface that faces away from the top wall of the cap, and wherein, in a direction perpendicular to the substantially flat attachment area of the cap, the top surface of the central area of the valve is located at a distance from the bottom surface of the peripheral area of the valve seen in a direction from the top wall of the cap towards the access opening of the cap, wherein said distance comprises at least a thickness of the valve.

4. A closure assembly according to claim 1, wherein the valve is made of polyolefin material, or of an elastomer material.

5. A closure assembly according to claim 1, wherein the valve has a thickness in the range of 0,005-0,6 mm.

6. A container provided with a closure assembly according to claim 1.

7. A closure assembly configured to be mounted on a neck of a container, wherein said closure assembly comprises a cap with a dispensing opening, an insert and a self closing dispensing valve attached to the insert, wherein said insert is provided in the cap such that the valve is located adjacent to the dispensing opening of the cap, and wherein the cap comprises a cylindrical shaped body section having a central axis, wherein said cylindrical body section defines an inner space extending along said central axis, an access opening at one end of the inner space for inserting the neck of the container into the inner space, and a top wall at an opposite end of the inner space, wherein said top wall has an inside surface facing the inner space and is provided with the dispensing opening for dispensing contents of the container, and wherein the insert comprises a disc shaped body section having a top surface, a bottom surface and a guide opening for guiding through the contents of the container, and wherein the top surface of the disc shaped body section defines a substantially flat and annular attachment area, wherein said attachment area extends around the guide opening, and wherein said top surface defines an annular rib that protrudes relative to the substantially flat attachment area, wherein said annular rib located between the attachment area and the guide opening, and the cap and the insert are configured such that the insert is fixed, in the inner space of the cap such that the top surface of the insert faces the inside surface of the top wall of the cap and the guide opening of the insert aligns with the dispensing opening in the top wall of the cap, the dispensing valve is a disc of foil material having a central valve area in which at least one self-closing slits is located and an annular peripheral attachment area extending around the central valve area, wherein with said annular peripheral attachment area the dispensing valve of foil material is attached to the attachment area of the insert, such that the central valve area aligns with the guide opening of the insert to close off said guide opening, and wherein the annular rib offsets the central valve area of the dispensing valve relative to the substantially flat attachment area of the insert.

8. A closure assembly according to claim 7, wherein the insert is positioned with the annular rib against the top wall of the cap, such that the dispensing valve of foil material is pinched between the annular rib and the top wall.

9. A closure assembly according to claim 7, wherein the valve has a bottom surface that faces the top surface of the insert and a top surface that faces away from the top surface of the insert, and wherein, in a direction perpendicular to the substantially flat attachment area of the insert, the bottom surface of the central area of the valve is located above the top surface of the peripheral area of the valve.

10. A closure assembly according to claim 7, wherein the annular rib of the insert has a height measured from the substantially flat attachment area of the insert, and the dispensing valve of foil material has a thickness, and the height of the annular rib is larger than the thickness of the dispensing valve of foil material.

11. A closure assembly according claim 7, wherein the disc shaped body of the insert is provided with one or more annular recesses radially outward of the substantially flat and annular attachment area, wherein said one or more annular recesses function as a resilient hinge that allows for local bending of the disc shaped body of the insert.

12. A closure assembly according to claim 7, wherein the inner space of the cap is provided with one or more support ribs, wherein said one or more support ribs engage the bottom surface of the disc shaped body of the insert, such that the insert is clamped between the one or more support ribs and the top wall of the cap, and is thus secured adjacent the top wall.

13. A closure assembly according to claim 7, wherein the valve is fixed to the attachment area of the insert, such that the valve is secured relative to the dispensing opening during use, by way of heat sealing.

14. A device for attaching the dispensing valve of foil material to the cap according to claim 1, the device comprising:
a seat for positioning and supporting the cap;
a heat sealing tool comprising an annular shaped head configured to engage the annular peripheral attachment area of the dispensing valve of foil material, wherein said head is movably supported such that said head can be moved towards and away from the attachment area of the cap positioned and supported in the seat, for pushing the annular peripheral attachment area of the valve contacting the annular rib of the cap towards the attachment area of the cap, and
for heat sealing the attachment area of the valve to the attachment area of the cap.

15. A device according to claim 14, wherein the annular head is an annular heat sealing rib, wherein said annular heat sealing rib has a height larger than the height of the annular rib on the cap combined with the thickness of the valve, such that the annular heat sealing rib can press the attachment area of the valve onto the attachment area of the cap during heat sealing, without the heat sealing tool contacting the central part of the valve supported by the annular rib.

16. A device for attaching the dispensing valve of foil material to the insert according to claim 7, the device comprising:
a seat for positioning and supporting the insert;
a heat sealing tool comprising an annular shaped head configured to engage the annular peripheral attachment area of the dispensing valve of foil material, wherein said head is movably supported such that said head can be moved towards and away from the attachment area of the insert positioned and supported in the seat, for pushing the annular peripheral attachment area of the valve contacting the annular rib of the insert towards the attachment area of the insert, and for heat sealing the attachment area of the valve to the attachment area of the insert.

17. The closure assembly according to claim 7, wherein the annular rib of the insert has a height measured from the substantially flat attachment area of the insert, and the dispensing valve of foil material has a thickness, and the height of the annular rib corresponds to the thickness of the dispensing valve of foil material.

18. A method for attaching a dispensing valve made of foil material to a cap, the method comprising the steps of:
providing a cap with a dispensing opening, and a self-closing dispensing valve attached to the cap such that said self-closing dispensing valve is located adjacent the dispensing opening, wherein the cap
comprises a cylindrical shaped body section having a central axis, wherein said cylindrical body section defines an inner space extending along said central axis, an access opening at one end of the inner space for inserting a neck of the container into the inner space, and a top wall at another end of the inner space, wherein said top wall has an inside surface facing the inner space and an outside surface facing an opposite direction, and wherein said top wall is provided with the dispensing opening for dispensing contents of the container, and wherein
the inside surface of the top wall defines a substantially flat and annular attachment area, wherein said attachment area extends around the dispensing opening, and wherein said inside surface defines an annular rib, wherein said rib is located between the attachment area and the dispensing opening, wherein said rib protrudes relative to the substantially flat attachment area;
positioning and supporting the cap;
providing a dispensing valve comprising a disc of foil material having a central valve area in which at least one self-closing slit is located and an annular peripheral attachment area extending around the central valve area;
positioning the dispensing valve on the annular rib of the cap, such that the dispensing valve contacts the annular rib of the cap, with the annular peripheral attachment area of the dispensing valve aligned with the annular attachment area of the cap, with the central valve area of the dispensing valve aligned with the dispensing opening of the cap, and thus with the central valve area of the valve positioned in a staggered position relative to the substantially flat attachment area of the cap;
pushing the annular peripheral attachment area of the dispensing valve onto the annular attachment area of the cap, thus positioning the attachment area of the valve in a staggered position relative to the central valve area of the valve, and thus straining the central valve area; and
attaching the attachment area of the valve to the annular attachment area of the cap by way of heat sealing, thus further straining the central valve area.

19. A closure assembly that is part of a container, or is configured to be part of a container, wherein said closure assembly comprises a neck part with a dispensing opening, and a self-closing dispensing valve attached to the neck part and located adjacent the dispensing opening, and wherein
the neck part comprises a cylindrical shaped body section having a central axis, wherein said cylindrical body section defines an inner space extending along said central axis, an access opening at one end of the inner space for receiving contents of the container body, and a top wall at another end of the inner space, wherein said top wall has an inside surface facing the inner space and an outside surface facing an opposite direction, and wherein said top wall is provided with the dispensing opening for dispensing the contents of the container,
wherein the outside surface of the top wall defines a substantially flat and annular attachment area, wherein said attachment area extends around the dispensing opening, and wherein said outside surface defines an annular rib, wherein said annular rib is located between the attachment area and the dispensing opening, and which rib protrudes relative to the substantially flat attachment area;
the self-closing dispensing valve is a disc of foil material having a central valve area in which at least one self-closing slit is located and an annular peripheral attachment area extending around the central valve area, wherein the dispensing valve is attached to the attachment area of the neck part, such that the central valve area aligns with the dispensing opening of the neck part to close off the dispensing opening, and wherein the annular rib offsets the central valve area of the dispensing valve relative to the substantially flat attachment area of the neck part.

20. A container comprising a closure assembly according to claim 19.

21. A closure assembly that is part of a container, or is configured to be part of a container, wherein said closure assembly comprises a neck part with a dispensing opening, and a self-closing dispensing valve attached to the neck part and located adjacent the dispensing opening, and wherein the neck part comprises a cylindrical shaped body section having a central axis, wherein said cylindrical body section defines an inner space extending along said central axis, an access opening at one end of the inner space for receiving contents of the container body, and a top wall at another end of the inner space, wherein said top wall has an inside surface facing the inner space and an outside surface facing an opposite direction, and wherein said top wall is provided with the dispensing opening for dispensing the contents of the container, wherein the inside surface of the top wall defines a substantially flat and annular attachment area, wherein said attachment area extends around the dispensing opening, and wherein said inside surface defines an annular rib, wherein said rib is located between the attachment area and the dispensing opening, and wherein said rib protrudes relative to the substantially flat attachment area;

the self-closing dispensing valve is a disc of foil material having a central valve area in which at least one self-closing slit is located and an annular peripheral attachment area extending around the central valve area, wherein with said attachment area the dispensing valve is attached to the attachment area of the neck part, such that the central valve area aligns with the dispensing opening of the neck part to close off the dispensing opening, and wherein the annular rib offsets the central valve area of the dispensing valve relative to the substantially flat attachment area of the neck part.

22. A method for attaching a dispensing valve made of foil material to an insert to be mounted in a cap, the method comprising the steps of:

providing a cap with a dispensing opening, an insert and a self closing dispensing valve attached to the insert, wherein said insert is provided in the cap such that the valve is located adjacent to the dispensing opening of the cap, wherein the cap comprises a cylindrical shaped body section having a central axis, wherein said cylindrical body section defines an inner space extending along said central axis, an access opening at one end of the inner space for inserting a neck of the container into the inner space, and a top wall at an opposite end of the inner space, wherein said top wall has an inside surface facing the inner space and is provided with the dispensing opening for dispensing contents of the container, the insert comprising a disc shaped body section having a top surface, a bottom surface and a guide opening for guiding through the contents of the container, and wherein the top surface of the disc shaped body section defines a substantially flat and annular attachment area, wherein said attachment area extends around the guide opening, and wherein said top surface defines an annular rib that protrudes relative to the substantially flat attachment area, wherein said annular rib located between the attachment area and the guide opening, and the cap and the insert are configured such that the insert is fixed, in the inner space of the cap such that the top surface of the insert faces the inside surface of the top wall of the cap and the guide opening of the insert aligns with the dispensing opening in the top wall of the cap;

positioning and supporting the cap or insert;

providing a dispensing valve comprising a disc of foil material having a central valve area in which at least one self-closing slit is located and an annular peripheral attachment area extending around the central valve area, wherein with said annular peripheral attachment area the dispensing valve of foil material is attached to the attachment area of the insert, such that the central valve area aligns with the guide opening of the insert to close off said guide opening, and wherein the annular rib offsets the central valve area of the dispensing valve relative to the substantially flat attachment area of the insert;

positioning the dispensing valve on the annular rib of the cap or insert, such that the dispensing valve contacts the annular rib of the cap or insert, with the annular peripheral attachment area of the dispensing valve aligned with the annular attachment area of the cap or insert, with the central valve area of the dispensing valve aligned with the dispensing opening of the cap or the guide opening of the insert, and thus with the central valve area of the valve positioned in a staggered position relative to the substantially flat attachment area of the cap or insert;

pushing the annular peripheral attachment area of the dispensing valve onto the annular attachment area of the cap or insert, thus positioning the attachment area of the valve in a staggered position relative to the central valve area of the valve, and thus straining the central valve area; and attaching the attachment area of the valve to the annular attachment area of the cap or insert by way of heat sealing, thus further straining the central valve area.

\* \* \* \* \*